(12) United States Patent
Veksler et al.

(10) Patent No.: US 9,061,788 B2
(45) Date of Patent: Jun. 23, 2015

(54) REDUCED-WEIGHT CONTAINER AND/OR TUBE FOR COMPRESSED GASES AND LIQUIDS

(75) Inventors: Mark D. Veksler, Tucson, AZ (US);
Raouf O. Loutfy, Tucson, AZ (US);
Eugene M. Wexler, Florence, SC (US)

(73) Assignee: MATERIALS & ELECTROCHEMICAL RESEARCH CORP., Tucson, AZ (US)

( * ) Notice: Subject to any disclaimer, the term of this patent is extended or adjusted under 35 U.S.C. 154(b) by 595 days.

(21) Appl. No.: 12/115,450

(22) Filed: May 5, 2008

(65) Prior Publication Data

US 2008/0283419 A1 Nov. 20, 2008

Related U.S. Application Data

(60) Provisional application No. 60/916,251, filed on May 4, 2007.

(51) Int. Cl.
 F17C 1/00 (2006.01)
 B65D 6/00 (2006.01)
 B65D 25/04 (2006.01)

(52) U.S. Cl.
 CPC *B65D 7/42* (2013.01); *B65D 25/04* (2013.01); *F17C 1/00* (2013.01); *F17C 2201/0109* (2013.01); *F17C 2201/0119* (2013.01); *F17C 2201/0138* (2013.01); *F17C 2201/0166* (2013.01); *F17C 2201/054* (2013.01); *F17C 2201/056* (2013.01); *F17C 2201/058* (2013.01); *F17C 2203/0609* (2013.01); *F17C 2203/0636* (2013.01); *F17C 2203/0646* (2013.01); *F17C 2203/066* (2013.01); *F17C 2205/0323* (2013.01); *F17C 2205/0397* (2013.01); *F17C 2209/221* (2013.01); *F17C 2209/227* (2013.01); *F17C 2209/234* (2013.01); *F17C 2221/011* (2013.01); *F17C 2221/012* (2013.01); *F17C 2221/014* (2013.01); *F17C 2221/016* (2013.01); *F17C 2221/033* (2013.01); *F17C 2223/0123* (2013.01); *F17C 2223/013* (2013.01); *F17C 2223/036* (2013.01); *F17C 2227/0135* (2013.01); *F17C 2260/012* (2013.01); *F17C 2270/0139* (2013.01); *F17C 2270/0184* (2013.01); *F17C 2270/0194* (2013.01); *Y02E 60/321* (2013.01)

(58) Field of Classification Search
 CPC .............. F17C 1/02; F17C 1/04; F17C 1/06; F17C 1/16
 USPC .......... 220/676, 669, 670, 585, 271, 671, 672, 220/673; 206/0.6
 See application file for complete search history.

(56) References Cited

U.S. PATENT DOCUMENTS

| | | | | |
|---|---|---|---|---|
| 1,374,905 A * | 4/1921 | Casey et al. | ................ | 220/592.2 |
| 1,892,531 A * | 12/1932 | McKee | ........................ | 220/672 |
| 2,131,753 A * | 10/1938 | Reid | ............................. | 422/109 |
| 2,366,140 A * | 12/1944 | Alderfer | ...................... | 220/585 |
| 2,381,396 A * | 8/1945 | Kuhn | ............................ | 220/592 |
| 2,507,778 A * | 5/1950 | Frey | ................................ | 220/585 |
| 2,889,953 A * | 6/1959 | Morrison | ................ | 220/560.06 |
| 2,962,195 A * | 11/1960 | Greenlee | ...................... | 222/394 |

(Continued)

*Primary Examiner* — Robert J Hicks
*Assistant Examiner* — Kareen Rush
(74) *Attorney, Agent, or Firm* — Hayes Soloway P.C.

(57) ABSTRACT

A reduced-weight container or vessel for storage, transportation and processing gases and liquids under pressure has a plurality of hollows formed in the outer wall, resulting in a reduced weight without compromising the structural integrity.

92 Claims, 8 Drawing Sheets

(56) References Cited

U.S. PATENT DOCUMENTS

| | | | | |
|---|---|---|---|---|
| 3,104,758 | A * | 9/1963 | Allen et al. | 206/0.6 |
| 3,167,204 | A * | 1/1965 | Rouse, Jr. | 220/4.12 |
| 3,252,610 | A * | 5/1966 | Greenlee | 220/585 |
| 3,314,567 | A | 4/1967 | Becker et al. | |
| 3,338,238 | A * | 8/1967 | Warncke | 128/205.12 |
| 3,407,249 | A * | 10/1968 | Landi | 264/49 |
| 3,503,171 | A * | 3/1970 | Frohly | 52/223.2 |
| 3,536,299 | A * | 10/1970 | Rucker et al. | 254/369 |
| 3,570,702 | A * | 3/1971 | Yamaoto | 220/560.06 |
| 3,611,966 | A * | 10/1971 | Hunter | 114/341 |
| 3,615,716 | A * | 10/1971 | Poulos | 426/119 |
| 3,640,237 | A * | 2/1972 | Phelps | 114/342 |
| 3,653,434 | A * | 4/1972 | Andersson | 165/169 |
| 3,711,371 | A * | 1/1973 | Cahill, Jr. | 376/294 |
| 3,713,560 | A | 1/1973 | Slysh et al. | |
| 3,944,106 | A * | 3/1976 | Lamb | 220/4.12 |
| 3,982,653 | A | 9/1976 | Becker | |
| 4,089,468 | A | 5/1978 | Alonso | |
| 4,261,415 | A * | 4/1981 | Smith, Jr. | 165/11.1 |
| 4,277,761 | A * | 7/1981 | Silva et al. | 427/539 |
| 4,315,385 | A * | 2/1982 | Moreau et al. | 220/585 |
| 4,765,694 | A * | 8/1988 | Cory | 305/189 |
| 4,842,139 | A * | 6/1989 | Krieg | 206/386 |
| 5,133,475 | A * | 7/1992 | Sharp | 220/589 |
| 5,346,371 | A * | 9/1994 | Bialy et al. | 417/312 |
| 5,375,735 | A * | 12/1994 | Huvey et al. | 220/589 |
| 5,388,867 | A * | 2/1995 | Szekely | 285/222.1 |
| 5,465,280 | A * | 11/1995 | Wedellsborg | 376/294 |
| 5,518,140 | A * | 5/1996 | Lenz et al. | 220/584 |
| 5,659,941 | A * | 8/1997 | Huvey | 29/421.1 |
| 5,800,905 | A * | 9/1998 | Sheridan et al. | 428/157 |
| 5,927,537 | A * | 7/1999 | Falk et al. | 220/501 |
| 6,190,481 | B1 * | 2/2001 | Iida et al. | 156/175 |
| 6,324,780 | B1 | 12/2001 | Behling | |
| 6,729,354 | B2 * | 5/2004 | Ishizu et al. | 138/109 |
| 6,979,776 | B1 * | 12/2005 | Zimmermann | 174/520 |
| 7,014,429 | B2 * | 3/2006 | Gray et al. | 417/269 |
| 7,152,665 | B2 * | 12/2006 | Toh et al. | 165/74 |
| 7,677,871 | B2 * | 3/2010 | Gray et al. | 417/269 |
| 7,886,940 | B2 * | 2/2011 | Lavan | 222/386.5 |
| 2004/0251007 | A1 * | 12/2004 | Toh et al. | 165/157 |
| 2006/0096993 | A1 * | 5/2006 | Takashima | 220/588 |
| 2009/0321441 | A1 * | 12/2009 | Horlacher et al. | 220/86.2 |
| 2013/0105026 | A1 * | 5/2013 | Biaggi et al. | 138/121 |

\* cited by examiner

REDUCED-WEIGHT CONTAINER AND/OR TUBE FOR COMPRESSED GASES AND LIQUIDS

CROSS-REFERENCE TO RELATED APPLICATIONS

The present application claims priority from U.S. Provisional Application Ser. No. 60/916,251, filed May 4, 2007, the contents of which are incorporated by reference.

FIELD OF THE INVENTION

The present invention relates to reduced-weight container and tube bodies. The invention has particular utility in the formation of container, vessels and tubes for the storage, transportation and processing of compressed gases and liquids, and will be described in connection with such utility, although other utilities are contemplated including utilities in which a cylindrical cavity is exposed to internal pressure of gases or liquids, for example, in gun barrels, jet propulsion engines, hydraulic cylinders, gas turbines, conduits and the like.

BACKGROUND OF THE INVENTION

Today's technology for transporting, storing and processing compressed gases and liquids is mainly realized by using containers (cylinders/vessels) or tubes or pipes made of metals and their alloys. In the following description, "tubes" and "pipes" on the one hand, and "cylinders", "vessels" and "containers" on the other hand are used interchangeably.

Some gases, for example, nitrogen ($N_2$), oxygen ($O_2$), argon (Ar), hydrogen ($H_2$), natural gas ($CH_4$), etc., whose critical temperatures are below ambient, can "economically" be stored and transported in gaseous state only at high pressures ($N_2$, $O_2$, Ar, $H_2$—in containers and natural gas, $CH_4$, mostly—in pipelines as well as in containers). Some liquids are stored and transported in containers or pumped through pipelines under pressure.

Regardless of the high pressure inside the container (15-35 MPa), such storage and/or transportation requires heavy hardware. As a result the net weight percent of gas storage in a majority of cases does not exceed 5-10%. When storing low molecular weight gases, for example, hydrogen, the net weight percent of gas storage may be less than about 1%. A similar situation takes place in case of pipelines which also are much heavier than the confined gas. The present invention aims at significant decrease of the weight of containers and pipes (seamless or welded) used for storage and transportation of gases and liquids.

OBJECTIVE AND ADVANTAGES OF THE PRESENT INVENTION

A primary objective of the present invention is to create a new design of container or pipe which combines reduced weight without compromising structural integrity (thus, safety), reduced cost and increased capacity for a given size container or pipe, and can open the way for such design into new industries where gas/liquid storage, transportation and processing are utilized. The new reduced-weight design of the container or pipe can be especially effective in cases where mass is at premium (for example, in spacecraft), or for methane or hydrogen gas storage both in fuel cell powered vehicles and hydrogen refilling stations. Also, broad implementation of the design of containers and pipes of the present invention will lead to reduced requirements for metal, reduce the cost of gas storage, energy and cost of transportation, with a positive effect on the environment.

SUMMARY OF THE INVENTION

In accordance to the present invention, there is provided a new design of containers and pipes (seamless or welded) for storage and transportation of gases and liquids, in which the container or pipe outer walls comprises of hollows and/or channeled wall as opposed to solid wall, which provides significant mass reduction of said containers and tubes (up to about 30% or more) without compromising structural integrity (and thus, safety), and while providing an increase in capacity of said containers (up to 55% or more at high pressures) and, in the case of tubes or pipes, an increase in flow cross-section of up to 20% or more. In a preferred embodiment of the invention the containers also include a bundle of thin-walled tubes within the containers.

BRIEF DESCRIPTION OF THE DRAWINGS

Further features and advantages of the present invention will be seen from the following detailed description taken in conjunction with the accompanying drawings, wherein like numerals depict like parts, and wherein.

DETAILED DESCRIPTION OF THE PREFERRED EMBODIMENTS

The present invention is based on the unexpected discovery that the walls of a cylindrical container or pipe may be reduced in mass without loss of strength by forming a plurality of hollows (channels) in the outer wall of the container or pipe. The hollows should be rounded in cross-section, at least in part, preferably circular, semi-circular, ellipsoid, semi-ellipsoid or paraboloid in cross-section, at least in part. While not wishing to be bound by theory, it is believed that the channels or hollows by increasing the wall surface area, increase the surface upon which the pressure acts. This in turn redistributes the stresses and as a result, hoop tensile stresses are reduced, and the container or pipe can be made lighter, and yet remain strong and safe, in comparison with containers or pipes having solid walls of the same outer diameter and subjected to the same pressure of gas or liquid.

Figure 1A:
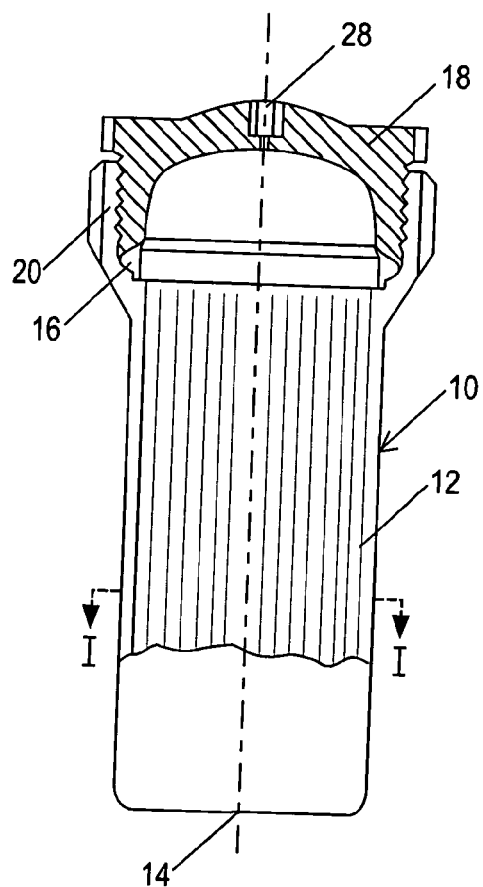
FIG. 1A is an elevational view, in cross section, of a container made in accordance with the present invention showing outside hollow wall with tubular holes.
Figure 1C:
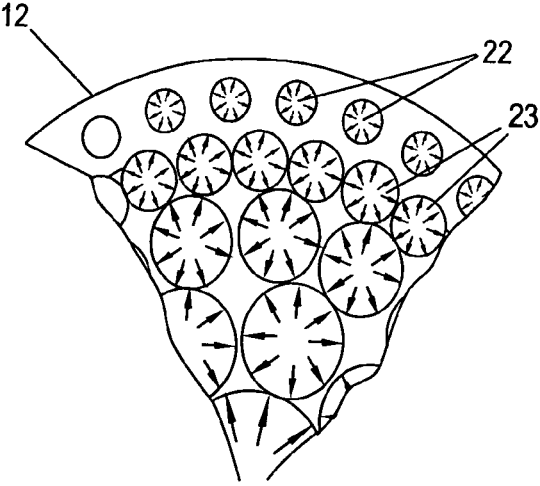
FIG. 1C is an enlarged view of a portion of FIG. 1B showing acting pressure in all holes.
Figure 1B:
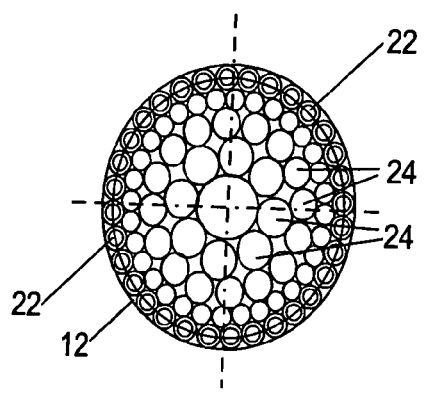
FIG. 1B is a cross-sectional view taken along line I-I of the container of FIG. 1A showing outside hollow wall and thinner wall tubular holes inside.
Figure 1D:
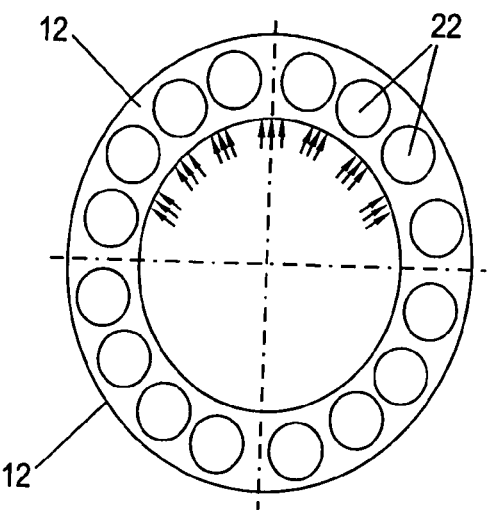
FIG. 1D is a view similar to FIG. 1B, with inner tubes removed with acting pressure on outside wall.

A simplified view of acting forces (pressures) in all tubes (holes) and the interaction between can be visualized by referring to FIG. 1C and FIG. 1D. It can be seen that when a compressed gas is supplied in all holes (tubes) and in the space between them, if any, the wall of the thin-walled tubes of the inner cavity is not subjected to tensile stresses, because the forces (pressures) acting on these walls are equal and have opposite directions, and thus originate only compressive stresses. In places of contact between thin-walled tubes 24 and thick-walled tubes of the outer hollow wall 12 of vessel 10 an analogous action and distribution of forces (pressure) also exists, which can be represented when the action of the inner bundle of thin-walled tubes (as thin as possible) is graphically substituted with forces (pressures) created by this bunch as shown in FIG. 1 D. Now, it can be seen that the pressure of the supplied gas in the thin-walled tubes of cylindrical cavity is acting only on part of the internal surface of the vessel 10 and thus creating essentially only compressive stresses on the wall 12 of the vessel 10. As a result, the hoop tensile stresses arising in the wall 12 of the vessel 10 are greatly reduced. While not wishing to be bound by theory, the larger the surface, where the compressive stresses originate, the smaller the hoop tensile stresses developing in the vessel wall 12. This relationship has been proved to exist empirically by a number of actual experiments. Thus, we have discovered, through experimentation, that a hollow wall design in accordance with our invention can be lighter and at the same time sufficiently strong, and thus safe, in comparison with a solid wall design of the container having the same outer diameter and exposed to the same pressure of gas or liquid.

More particularly, as will be discussed below in connection with the several illustrated embodiments each high-pressure vessel has a cylindrically shaped exterior wall defining a hollow space. A plurality of hollows are formed within the vessel exterior wall. Optionally, the vessel may also include a bundle of thin-walled tubes contained within the interior of the vessel.

More particularly, and referring to FIGS. 1A-1C, in broad concept, a high pressure storage vessel in accordance with the present invention comprises a cylindrically shaped vessel 10 having an exterior wall 12 and a base 14. The top end of vessel 10 is flared at 16. Vessel 10 is capped by a threaded closure 18 which engages with threads formed in flare 16, capturing a deformable sealing ring 20, and sealing the vessel, leaving the tops of the tubular hollows open. Tubular hollows 22 are evenly spaced around the periphery of and formed in outer wall 12. Referring in particular to FIGS. 1B and 1C, in a preferred embodiment of the invention, a bundle of thin-walled tubular hollows 24 may be provided in the interior of the vessel 10. Tubular hollows 24 are open at their top and closed at their bottom ends. In a preferred embodiment of the invention as illustrated in FIGS. 1B and 1C, tubular hollows 24 are made in graded sizes. While tubular hollows 24 displace a small amount of the interior volume of vessel 10, the tubular hollows 24 can contribute significantly to decreasing the pressure on and thus the stresses in the vessel outer wall. Tubular hollows 24 may have the same diameter, or may have graded diameters to better pack within the interior of vessel 10.

Thus, a feature and advantage of the present invention that results from the provision of tubular hollows in the outer wall is that the weight of the container may be substantially reduced without reduction or sacrificing structural integrity. An alternative prior art structure having the same outer diameter, designed for a similar high pressure, and involving a solid wall vessel would require a wall thickness significantly greater than the volume displaced by the thin-walled tubes, and would also add significantly to the weight of the vessel far more than the weight of the thin-walled tubes.

Completing the vessel of this first embodiment is a fixture 28 formed in the cover 18 for accommodating valving or the like for loading and unloading the vessel.

As mentioned above we have discovered that a hollow wall design can be lighter and at the same time sufficiently strong, and thus, safe, in comparison with the solid wall design of a container having the same outer diameter and exposed to the same pressure of gas or liquid. This was proved by running a series of experiments using several model samples that were made and tested at service pressures in the range between 15.5-40 MPa and to burst pressures. The tests showed that the weight of cylindrical hollow-walled part can be reduced by 35-40% in comparison to a solid-wall design without compromising structural integrity (and, thus, safety).

Figure 2A:
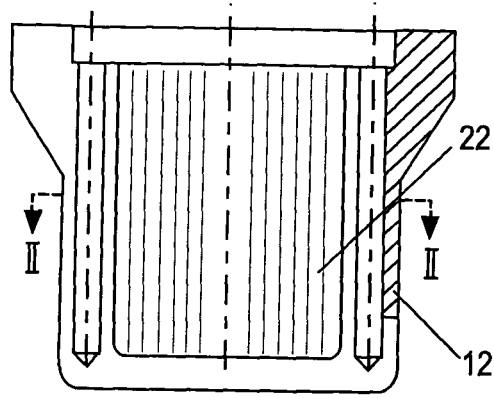
FIG. 2A is an elevational, cross section of actual cylindrical container made in accordance with the present invention.
Figure 2B:
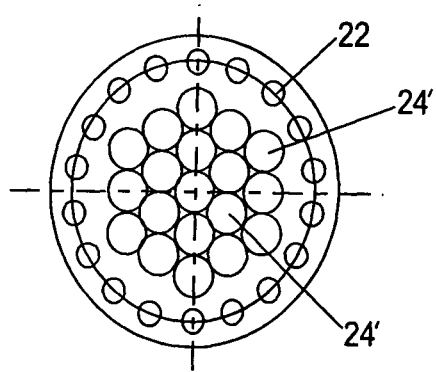
FIG. 2B is a cross-sectional view taken along line II-II of FIG. 2A showing outside wall with thick-walled tubular holes and inner cavity with thin-walled tubular holes.

More particularly, an alternative embodiment of an actually made and tested small vessel of hollow-wall design is shown in FIGS. 2A and 2B. In the FIGS. 2A and 2B embodiment, the thin-walled tubes 24 bundled within the interior of the vessel are all the same diameter. Tubes 24 touch one another, as shown before in the vessel 10, in the interior of the vessel. The wall thickness between the thin-walled tubes 24 in the internal cavity was 0.1 mm, and the minimal thickness of the walls of the tubular holes 22 in the vessel outer wall was 1 mm. The sample was tested under a service pressure of 40 MPa, and then the pressure was increased to 82 MPa, at which no sign of cracking or other damage on the outer and/or inner surfaces were observed. The above test proves the workability of our new concept (no reduction in strength despite the thickness of the wall with holes was several times less than that required for the solid-wall design having the same outer diameter and exposed to the same pressure). Having proved our new concept, we developed sample cylinders of hollow—wall design without the bundle of thin walled tubes in the interior.

Figure 3A:
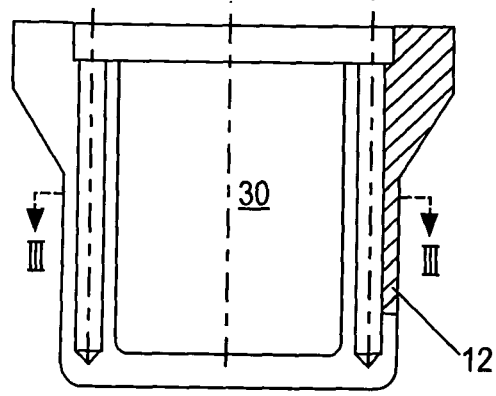
FIG. 3A is an elevational view, in cross section, of actual design of yet another storage vessel made and tested in accordance with another embodiment of the present invention.
Figure 3B:
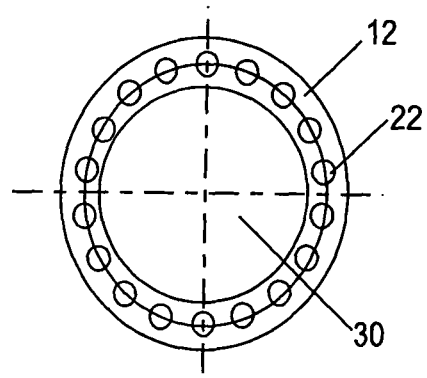
FIG. 3B is a cross-sectional view taken along line III-III of FIG. 3A showing hollow wall with tubular holes.

FIGS. 3A and 3B illustrate one such embodiment of the invention. The storage vessel illustrated in FIGS. 3A and 3B is similar to the storage vessel illustrated in FIGS. 2A and 2B except that there is no bundle of thin walled tubes in the interior space 30 of the storage vessel. FIGS. 3A and 3B show an actual tested sample. The minimal thickness of the walls of the tubular round holes was 1 mm. This sample was tested under the same pressure and with the same positive results as the sample from FIGS. 2A and 2B. The mass reduction of its hollow wall was almost 40% when compared with the solid-wall cylinder of the same outer diameter and capable of handling the same service pressure.

Figure 4A:
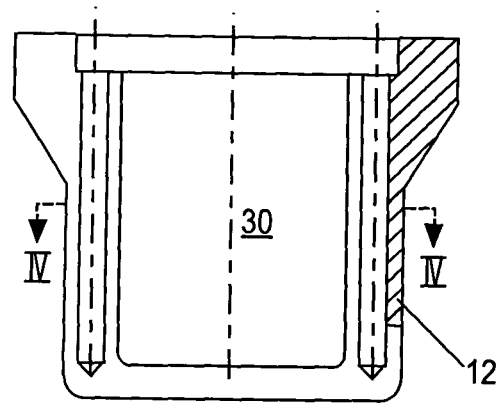
FIG. 4A is a view similar to FIG. 3A of another actual storage container made in accordance with the present invention where some of the tubular holes opened to the inside inner cavity.
Figure 4B:
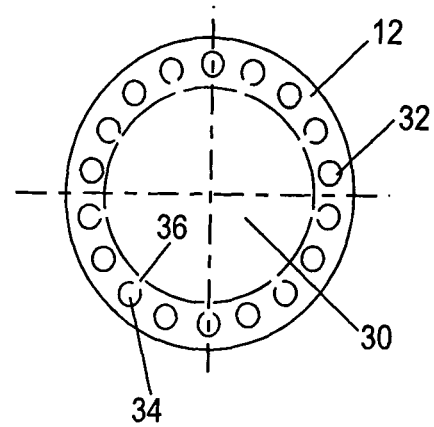
FIG. 4B is a view taken along line IV-IV of FIG. 4A.

FIGS. 4A and 4B illustrate yet another embodiment of the invention of an actually made and tested small vessel of hollow-wall design. In the embodiment shown in FIGS. 4A and 4B, vessel wall 12 includes closed tubular hollows 32 alternating with slotted hollows 34 that have a slot 36 opening into the interior 30 of the vessel. FIGS. 4A and 4B show the actual tested sample—cylinder, which is a prototype of a hollow walled cylinder, as well as of a seamless tube with round-shaped hollows opened into the internal cavity of the cylinder and oriented parallel to the central axis of the cylinder. The minimal thickness of the wall where cracks were expected was 0.25 mm. The outer diameter was the same as in the samples shown in FIGS. 2A and 2B and 3A and 3B. This sample was tested under the service pressure of 14.5 MPa and then burst at the pressure of 37.5 MPa (no reduction in strength was seen in this case either). The weight reduction was 40% in comparison with a solid-walled sample of the same diameter. This was unexpected that the hollows can be open to the interior of the vessel cavity and have the same strength.

Figure 5A:
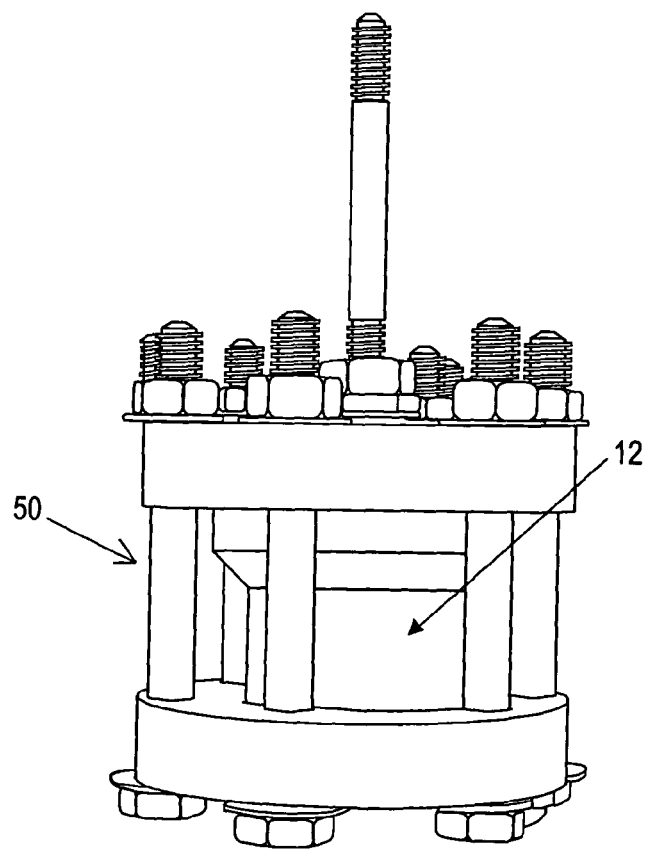
FIG. 5A an elevational view of a testing fixture.
Figure 5B:
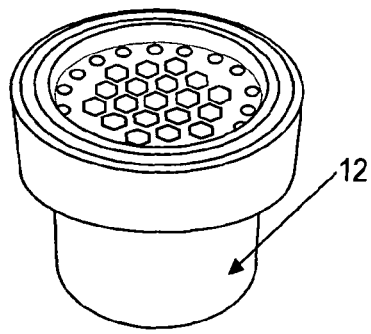
FIGS. 5B and 5C are respective views of actual sample containers made in accordance with the present invention and tested.
Figure 5C:
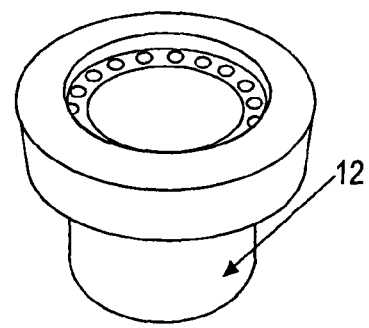

FIG. 5A illustrates an actual test fixture made and FIGS. 5B and 5C illustrate the actual vessels pressure tested in accordance with the present invention of the vessel design described in FIGS. 3 and 2, respectively.

The vessels were clamped in the test fixture 50 and pressurized under an initial service pressure and the pressure was then raised to or near burst pressure.

Figure 6A:
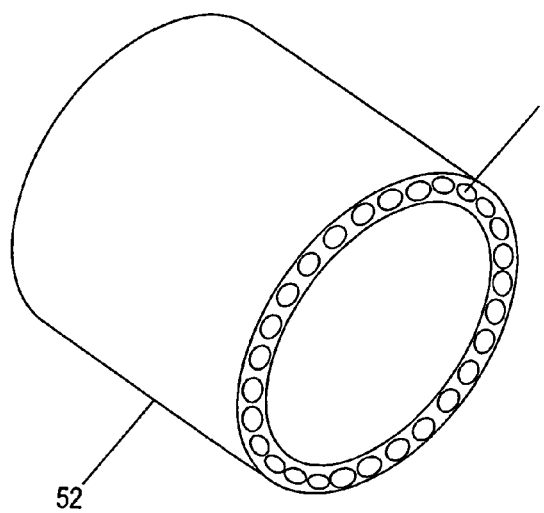
FIG. 6A is a perspective view.
Figure 6C:
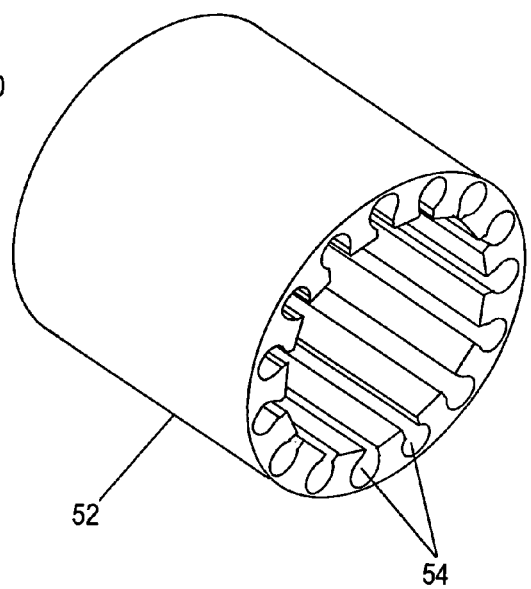
FIG. 6C is a perspective view and FIG. 6D is a top plan view of an alternative hollow-walled tube or pipe made in accordance with the present invention where tubular holes are opened to the inside cavity.
Figure 6B:
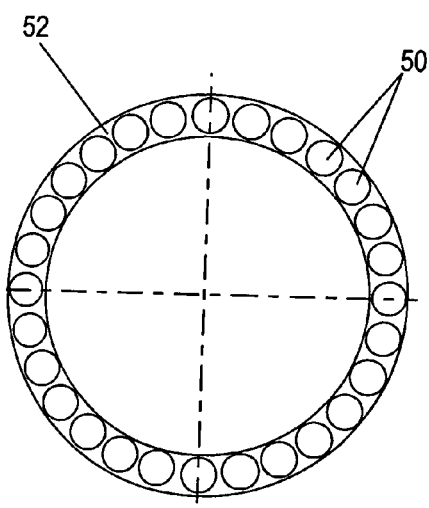
FIG. 6B is a top plan view of closed hollow-walled tube or pipe made in accordance with one embodiment of the invention.
Figure 6D:
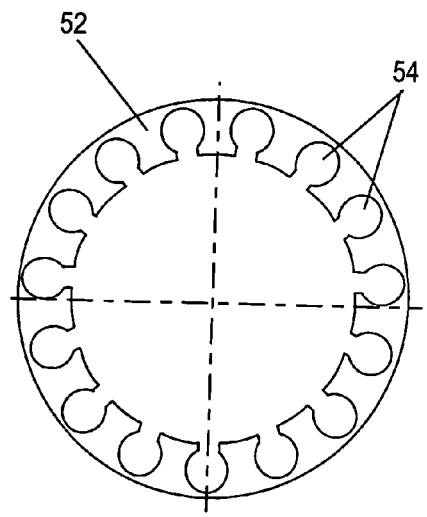

FIGS. 6A and 6B show an elongate cylindrical tube or pipe 52 having tubular hollows made in accordance with another embodiment of the present invention. The hollows are oriented parallel to the vessel axis and can be either closed 50 or opened 54 inside the internal cavity of the tube or pipe. While closed hollows 50 illustrated in FIGS. 6A and 6B are preferred from the standpoint of strength, open hollows 51, such as shown in FIGS. 6C and 6D are easier to manufacture. The cross-section of these hollows can be different—round, semi-round, ellipsoidal, semi-ellipsoid, paraboloid, etc. The dimensions, roundness and thickness of the walls can be adjusted to the requirements of the manufacturing equipment.

Figure 7A:
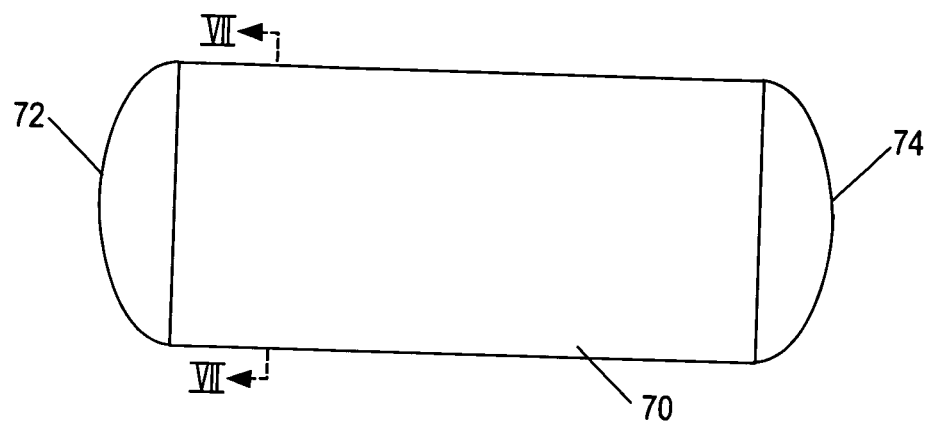
FIG. 7A a schematic illustration of a vessel of pre-fabrication design view and FIG. 7B is a cross-sectional view taken along section VII-VII of a storage vessel made in accordance with the present invention showing channel profile of hollow-walled channeled designed thin-walled shells pre-fabricated and welded.
Figure 7B:
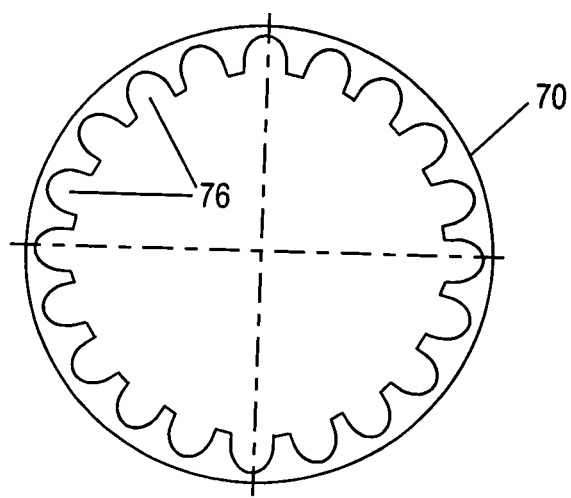

FIGS. 7A and 7B illustrate a hollow-walled vessel made in accordance with yet another embodiment of the present invention. In the FIG. 7 embodiment, the main body comprises an elongate cylindrical vessel 70 capped at both ends 72, 74. As before, the cylindrical walls of the vessel 70 have a plurality of hollows 76 formed in the wall of the cylinder 70. Such vessels design would be working under comparatively low pressure. So, they have a relatively thinner wall thickness, in which creation of hollows is difficult and sometimes impossible at all. Therefore, a method of prefabrication should be used, which comprises the rolling of the shell using for this a prepared in advance metal sheet, having the specified profile and then welding the shell. There are many ways to fabricate the hollow walls in relatively thick wall, including machining e.g., drilling, extrusion casting, etc. Alternatively, the wall shape could be preformed from sheet stock, e.g., by rolling, stamping, forging, etc., and the sheet formed into an elongate container. The tubes may be formed, for example, by machining from a solid stock or tubular stock. Neck and base members can be separately formed and assembled to the tubes.

Figure 8A:
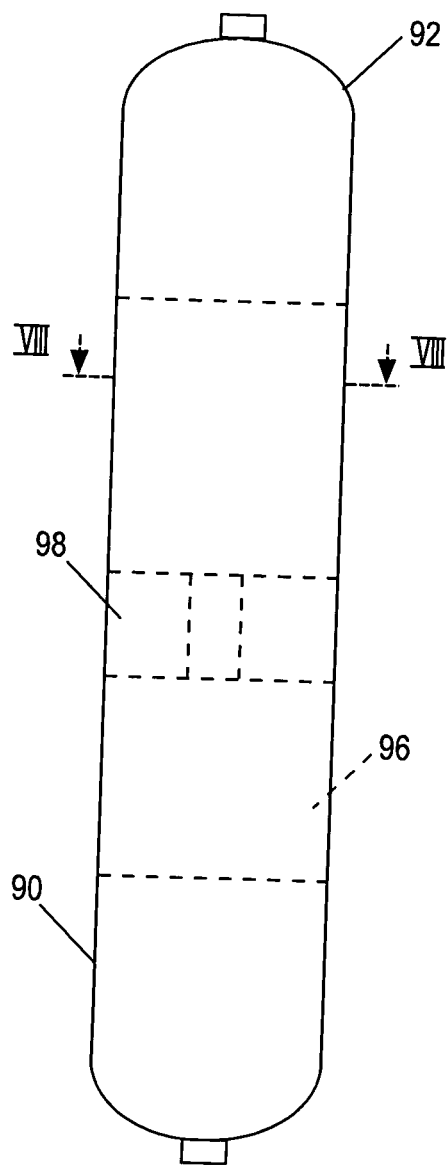
FIG. 8A is a side elevational view, and FIG. 8B a cross-sectional view taken along line VIII-VIII of FIG. 8A of an actual storage container made from aluminum alloy in accordance with the present invention.
Figure 8B:
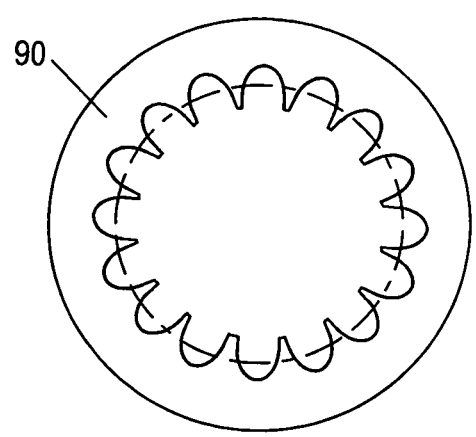

Another full size actual high-pressure storage cylinder 90 made in accordance with the present invention is shown in FIGS. 8A and 8B. The storage cylinder has an outside diameter of 152 mm (6 in), and a length of 900 mm. The main body 92 of the cylinder was formed of aluminum alloy by extrusion. The ends 94, 96 were formed by swaging. The cylinder was designed for a service pressure of 69 MPa (10,000 psi). The resulting cylinder was tested in accordance with the requirements of ASME and DOT with a safety factor of 2.5, and was life cycled—according to ASME requirements. The weight reduction, when compared with a cylinder of regular (solid-wall) design having the same outside diameter, length and designed for the same service pressure, was 32%. Capacity increase was more than 55%, when compared to a cylinder of regular (solid-wall) design having the same exterior dimensions.

The vessel or pipe may be formed using conventional manufacturing processes, including extrusion, pressure casting, rolling, spinning, drawing, welding, machining, powder metallurgy, etc. Other changes may be made in the foregoing invention without departing from the spirit and scope thereof. For example, the bundle of tubes or hollows installed within the cavity of the cylinder or vessel may be formed or prefabricated apart from the cylinder or vessel, e.g. of light weight lower strength materials such as thin-wall metal or even plastic, and joined gas-tight to one another by welding, soldering, gluing, plastic joining or composite material joining. Additionally, the tubes or hollows formed in the walls of the vessel or pipe may be oriented symmetrically or asymmetrically with respect to the outside and inside surfaces of the vessel or pipe walls. Also, while the hollows have been shown as oriented parallel to the axis of the cylinder or pipe, the hollows may be oriented non-parallel to the central axis of the cylinder or pipe. Additionally, the hollows may have different shapes, circular, semi-circular, ellipsoid, semi-ellipsoid, or paraboloid, at least in part, and also may be formed in the end caps of the cylinder.

Additionally, a cylinder or pipe formed in accordance with the present invention may be wrapped with an exterior wrapping shown in phantom at 96 in FIG. 8A, to prevent possible bulging. Also, if desired, the cylinder or pipe may be effectively shortened in length by partitioning the cylinder or pipe with an insert shown in phantom at 98 in FIG. 8A, which may be formed integrally with the cylinder or pipe, e.g., by forming during extrusion. Alternatively, an insert may be separately formed and installed into the cylinder or pipe as a close-fit insert. The insert should have one or more apertures therethrough, preferably a central hole 100 for permitting gas flow therethough. Yet other changes are possible.

What is claimed is:

1. A container or vessel enclosing an interior for storage, transportation or processing of high-pressure gases and/or liquids at service pressures of at least 15.5 MPa, having a circular cylindrically shaped outer wall of unitary construction, having a periphery, and a plurality of elongate empty hollows formed in the container or vessel circular cylindrically shaped outer wall, which hollows are evenly spaced around the entire periphery of the circular cylindrically shaped outer wall, and which hollows provide a weight reduction without compromising structural integrity under pressure exerted on the container or vessel by the high-pressure gases and/or liquids held within its interior, and a threaded closure sealing the container or vessel.

2. The container or vessel as claimed in claim 1, wherein said hollows are symmetrically located within said circular cylindrically shaped outer wall.

3. The container or vessel as claimed in claim 1, wherein said hollows are asymmetrically located within said outer wall.

4. The container or vessel as claimed in claim 1, wherein said hollows are closed to the interior of said container or vessel along their entire length.

5. The container or vessel as claimed in claim 1, wherein at least some of the hollows are open to the interior of said container or vessel.

6. The cylinder or vessel as claimed in claim 1, wherein said hollows run parallel to a long axis of said container or vessel.

7. The container or vessel as claimed in claim 1, wherein said hollows comprise tubular shaped hollows.

8. The container or vessel as claimed in claim 1, wherein said hollows are round in cross-section, at least in part.

9. The container or vessel as claimed in claim 8, wherein said tubular shaped hollows are circular, semi-circular, ellipsoidal semi-ellipsoidal or parabolic in cross-section, at least in part.

10. The container or vessel as claimed in claim 1, wherein said hollows comprise pre-formed tubes of different cross-section shape joined undetachably and gas-tightly along their lengths.

11. The container or vessel as claimed in claim 1, wherein the tubes comprise pre-formed tubes joined along their sides to an interior surface of the outer wall of the container or vessel.

12. The container or vessel as claimed in claim 1, further comprising a bundle of thin-walled tubes occupying a volume within the interior of the container or vessel.

13. The container or vessel as claimed in claim 12, wherein at least some of the hollows in the container or vessel outer wall and the tubes forming the bundle have different diameters.

14. The container or vessel as claimed in claim 12, wherein the hollows in the container or vessel circular cylindrically shaped outer wall and at least some of the tubes forming the bundle have the same diameter.

15. The container or vessel as claimed in claim 12, wherein at least some of the bundle of tubes are formed of plastic.

16. The container or vessel as claimed in claim 1, wherein the pre formed hollow tubes are welded to an interior surface of said outer wall.

17. The container or vessel as claimed in claim 1, further comprising a wrap surrounding the container or vessel, at least in part.

18. The container or vessel as claimed in claim 1, further comprising at least one aperture insert located within the container or vessel.

19. The container or vessel as claimed in claim 18, wherein the insert is formed integrally with the container or vessel.

20. The container or vessel as claimed in claim 18, wherein the insert is close fitted into the container or vessel.

21. The container or vessel as claimed in claim 1, wherein the container or vessel is an elongate pipe.

22. The container or vessel as claimed in claim 1, wherein the container or vessel is a closed storage vessel.

23. A method for reducing hoop stresses in an outer wall of a high pressure container or vessel for storage, transportation or processing of high-pressure gases and/or liquids at service pressures of at least 15.5 MPa, having a circular cylindrically shaped outer wall of unitary construction having a periphery, and a threaded closure for sealing the container or vessel, which comprises providing a plurality of elongate empty hollows in the circular cylindrically shaped outer wall of the container or vessel, wherein the plurality of elongated hollows are evenly spaced around the entire periphery of the circular cylindrically shaped outer wall, and which hollows provide a weight reduction without compromising structural integrity under pressure exerted on the container or vessel by the high-pressure gases and/or liquids held within its interior.

24. The method as claimed in claim 23 wherein said hollows are symmetrically located within said circular cylindrically shaped outer wall.

25. The method as claimed in. claim 24, wherein said hollows are asymmetrically located within said outer wall.

26. The method as claimed in claim 24, wherein said hollows are closed to an interior of said container or vessel along their entire length.

27. The method as claimed in claim 24, wherein at least some of the hollows are open to an interior of said container or vessel.

28. The method as claimed in claim 24, wherein said hollows run parallel to a long axis of said container or vessel.

29. The method as claimed in claim 24, wherein said hollows comprise tubular shaped hollows.

30. The method as claimed in claim 24, wherein said hollows are round in cross-section, at least in part.

31. The method as claimed in claim 30, wherein said tubular shaped hollows are circular, semi-circular, ellipsoidal semi-ellipsoidal, or parabolic in cross-section, at least in part.

32. The method as claimed in claim 24, wherein said hollows comprise pre-formed tubes of different cross-section shape joined undetachably and gas-tightly along their lengths.

33. The method as claimed in claim 24, wherein the tubes comprise pre-formed tubes joined along their sides to an interior surface of an exterior wall of the container or vessel.

34. The method as claimed in claim 24, further comprising a bundle of thin-walled hollows occupying a volume within an interior of the container or vessel.

35. The method as claimed in claim 34, wherein at least some of the hollows in the container or vessel outer wall and. the tubes forming the bundle have different diameters.

36. The method as claimed in claim 34, wherein the hollows in the container or vessel circular cylindrically shaped outer wall and at least some of a plurality of tubes forming the bundle have the same diameter.

37. The method as claimed in claim 34, wherein at least some of the bundle of a plurality of tubes are formed of plastic.

38. The method as claimed in claim 33, wherein the pre formed hollow tubes are welded to an interior surface of said outer wall.

39. The method claimed in claim 24, further comprising a wrap surrounding the container or vessel body, at least in part.

40. The method as claimed in claim 24, further comprising at least one aperture insert located within the container or vessel.

41. The method as claimed in claim 40, wherein the insert is formed integrally with the container or vessel.

42. The method as claimed in claim 40, wherein the insert is close fitted into the container or vessel.

43. A high pressure container or vessel for storage, transportation or processing of high-pressure gases or liquids at service pressures of at least 15.5 MPa, having a circular cylindrically shaped outer wall having a periphery enclosing an interior, having a plurality of elongate empty hollows formed in the circular cylindrically shaped outer wall of unitary construction, evenly spaced around the entire periphery of the circular cylindrically shaped outer wall, which hollows provide a weight reduction without comprising structural integrity, reducing hoop stresses from pressure exerted on the container or vessel by the high-pressure gases and/or liquids held within the container or vessel, and a threaded closure sealing the container or vessel.

44. The container or vessel as claimed in claim 43, wherein said hollows are symmetrically located within said circular cylindrically shaped outer wall.

45. The container or vessel as claimed in claim 43, wherein said hollows are asymmetrically located within said outer wall.

46. The container or vessel as claimed in claim 43, wherein said hollows are closed to the interior of said container or vessel along their entire length.

47. The container or vessel as claimed in claim 43, wherein at least some of the hollows are open to the interior of said container or vessel.

48. The container or vessel as claimed in claim 43, wherein said hollows run parallel, to along axis of said container or vessel.

49. The container or vessel as claimed in claim 43, wherein said hollows comprise tubular shaped hollows.

50. The container or vessel as claimed in claim 43, wherein said hollows are round in cross-section, at least in part.

51. The container or vessel as claimed in claim 50, wherein said tubular shaped hollows are circular, semi-circular, ellipsoidal semi-ellipsoidal, or parabolic in cross-section, at least in part.

52. The container or vessel, as claimed in claim 43, wherein said hollows comprise pre-formed tubes of different cross-section shape joined undetachably and gas-tightly along their lengths.

53. The container or vessel as claimed in claim 43, wherein the plurality of tubes comprise pre-formed tubes joined along their sides to an interior surface of the cylindrical outer wall of the container or vessel.

54. The container or vessel as claimed in claim 43, further comprising a bundle of thin-walled hollow tubes occupying a volume within the interior of the container or vessel.

55. The container or vessel as claimed in claim 54, wherein at least some of the hollows in the container or vessel outer wall and the tubes forming the bundle have different diameters.

56. The container or vessel as claimed, in claim 54, wherein the hollows in the container or vessel circular cylindrically shaped outer wall and at least some of the tubes forming the bundle have the same diameter.

57. The container or vessel as claimed in claim 54, wherein at least some of the bundle of tubes are formed of plastic.

58. The container or vessel as claimed in claim 53, wherein the pre-formed hollow tubes are welded to an interior surface of said outer wall.

59. The container or vessel as claimed in claim 43, further comprising a wrap surrounding the container or vessel, at least in part.

60. The container or vessel as claimed in claim 47, further comprising at least one aperture insert located within the container or vessel.

61. The container or vessel as claimed in claim 60, wherein the insert is formed integrally with the container or vessel.

62. The container or vessel as claimed in claim 60, wherein the insert is close fitted into the container or vessel.

63. The container or vessel as claimed in claim 43, wherein the container or vessel is an elongate pipe.

64. The container or vessel as claimed in claim 43, wherein the container or vessel is a closed storage vessel.

65. The container or vessel as claimed in claim 1, wherein at least some of the hollows are under pressure of stored gas.

66. The container or vessel as claimed in claim 43, wherein the hollows are under pressure of stored gas.

67. The container or vessel claimed in claim 1, wherein the hollows have cross-section axes of symmetry positioned on a radius of said container or vessel.

68. The container or vessel claimed in claim 1, wherein the hollows have cross-section axes of symmetry positioned at an angle in a cross-section plane to a radius of said container or vessel.

69. The cylinder or vessel as claimed in claim 1, wherein the hollows run at an angle to a long axis of said cylinder or vessel.

70. The cylinder or vessel as claimed in claim 69, wherein the hollows run in a helical direction.

71. The method as claimed in claim 23, wherein at least some of the hollows are pressurized.

72. The method as claimed in claim 23, wherein the hollows have cross-section axes of symmetry positioned on a radius of said container or vessel.

73. The method as claimed in claim 23, wherein the hollows have cross-section axes of symmetry positioned at an angle in a cross-section plane to a radius of said container or vessel.

74. The method as claimed in claim 23, wherein the hollows run at an angle to a long axis of said container or vessel.

75. The method as claimed in claim 74, wherein the hollows run in a helical direction.

76. The container or vessel as claimed in claim 43, wherein at least the hollows are pressurized.

77. The container or vessel claimed in claim 43, wherein the hollows have cross-section axes of symmetry positioned on a radius of said container or vessel.

78. The container or vessel claimed in claim 43, wherein the open hollows have cross-section axes of symmetry positioned at an angle in a cross-section plane to a radius of said container or vessel.

79. The cylinder or vessel as claimed in claim 43, wherein the hollows run at an angle to the long axis of said cylinder or vessel.

80. The cylinder or vessel as claimed in claim 79, wherein the hollows run in a helical direction.

81. The cylinder or vessel as claimed in claim 1, wherein the hollows open into the interior of the container or vessel.

82. The method as claimed in claim 23, wherein the hollows open into an interior of the container or vessel.

83. The container or vessel as claimed in claim 43, wherein the hollows open into the interior of the container or vessel.

84. A container or vessel enclosing an interior for storage, transportation or processing of high-pressure gases and/or liquids at service pressures of at least 15.5 MPa, having a circular cylindrically shaped outer wall having a periphery, and a plurality of elongate hollows formed in the container or vessel circular cylindrically shaped outer wall, which hollows are evenly spaced around the entire periphery of the circular cylindrically shaped outer wall, and which hollows provide a weight reduction without compromising structural integrity under pressure exerted on the container or vessel by the high-pressure gases and/or liquids held within its interior, and a threaded closure sealing the container or vessel, said container or vessel further comprising a bundle of thin-walled tubes occupying a volume within the interior of the container or vessel.

85. The container or vessel as claimed in claim 84, wherein the hollows in the container or vessel circular cylindrically shaped outer wall and at least some of the tubes forming the bundle have the same diameter.

86. The container or vessel as claimed in claim 84, wherein at least some of the bundle of tubes are formed of plastic.

87. A method for reducing hoop stresses in an outer wall of a high pressure container or vessel for storage, transportation or processing of high-pressure gases and/or liquids at service pressures of at least 15.5 MPa, having a circular cylindrically shaped outer wall having a periphery, and a threaded closure for sealing the container or vessel, which comprises providing a plurality of elongate hollows in the circular cylindrically shaped outer wall of the container or vessel, wherein the plurality of elongated hollows are evenly spaced around the entire periphery of the circular cylindrically shaped outer wall, and which hollows provide a weight reduction without compromising structural integrity under pressure exerted on the container or vessel by the high-pressure gases and/or liquids held within its interior, said container or vessel further comprising a bundle of thin-walled tubes occupying a volume within the interior of the container or vessel.

88. The method as claimed in claim 87, wherein the hollows in the container or vessel circular cylindrically shaped outer wall and at least some of a plurality of tubes forming the bundle have the same diameter.

89. The method as claimed in claim 87, wherein at least some of the bundle of a plurality of tubes are formed of plastic.

90. A high pressure container or vessel for storage, transportation or processing of high-pressure gases or liquids at service pressures of at least 15.5 MPa, having a circular cylindrically shaped outer wall having a periphery enclosing an interior, having a plurality of elongate hollows formed in the circular cylindrically shaped outer wall, evenly spaced around the entire periphery of the circular cylindrically shaped outer wall, for reducing hoop stresses from pressure exerted on the container or vessel by the high-pressure gases and/or liquids held within the container or vessel, and a threaded closure sealing the container or vessel, said container or vessel further comprising a bundle of thin-walled tubes occupying a volume within the interior of the container or vessel.

91. The container or vessel as claimed, in claim 90, wherein the hollows in the container or vessel circular cylindrically shaped outer wall and at least some of the tubes forming the bundle have the same diameter.

92. The container or vessel as claimed in claim 90, wherein at least some of the bundle of tubes are formed of plastic.

* * * * *